(12) United States Patent
Hollar, Jr. et al.

(10) Patent No.: US 10,596,727 B2
(45) Date of Patent: Mar. 24, 2020

(54) PROCESS FOR MANUFACTURING A DENSIFIED POLYMER POWDER, AND PROCESS OF MELT PROCESSING A DENSIFIED POLYMER POWDER

(71) Applicant: SABIC GLOBAL TECHNOLOGIES B.V., Bergen op Zoom (NL)

(72) Inventors: William E. Hollar, Jr., Mt. Vernon, IN (US); Robert Russell Gallucci, Mt. Vernon, IN (US); Franklin Ehrensbeck, Evansville, IN (US); Todd M. Loehr, Evansville, IN (US); Shankar Kollengodu Subramanian, Mt. Vernon, IN (US); Christopher Luke Hein, Evansville, IN (US); Qiying Jiang, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 226 days.

(21) Appl. No.: 15/518,792

(22) PCT Filed: Oct. 30, 2015

(86) PCT No.: PCT/IB2015/058424
§ 371 (c)(1),
(2) Date: Apr. 13, 2017

(87) PCT Pub. No.: WO2016/071817
PCT Pub. Date: May 12, 2016

(65) Prior Publication Data
US 2017/0232640 A1    Aug. 17, 2017

Related U.S. Application Data

(60) Provisional application No. 62/218,163, filed on Sep. 14, 2015, provisional application No. 62/076,850, filed on Nov. 7, 2014.

(51) Int. Cl.
*B29B 9/12* (2006.01)
*B29C 48/00* (2019.01)
(Continued)

(52) U.S. Cl.
CPC .................. *B29B 9/12* (2013.01); *B29B 9/02* (2013.01); *B29B 9/08* (2013.01); *B29B 9/16* (2013.01);
(Continued)

(58) Field of Classification Search
CPC ............ B29B 9/12; B29B 9/02; B29C 48/022
See application file for complete search history.

(56) References Cited

U.S. PATENT DOCUMENTS

| 267,074 A | 11/1882 | Germond |
| 452,976 A | 5/1891 | Goodwin |

(Continued)

FOREIGN PATENT DOCUMENTS

| EP | 1120436 A1 | 8/2001 |
| EP | 1123945 A2 | 8/2001 |

(Continued)

OTHER PUBLICATIONS

Chan et al.; "Facile Quantitative Analysis of Hydroxyl End Groups of Poly(2,6-dimethyl-1,4-phenylene oxide)s by 31P NMR Spectroscopy"; Macromolecules 1994; 27; pp. 6371-6375.

(Continued)

*Primary Examiner* — Jacob T Minskey
*Assistant Examiner* — Melody Tsui
(74) *Attorney, Agent, or Firm* — Cantor Colburn LLP

(57) ABSTRACT

Process for manufacturing a densified polymer powder comprising compressing a polymer feed that has a bulk density of less than or equal to 240 kg/m in a roll compactor comprising at least two compaction rolls to obtain a densified polymer material, wherein a gap between the two rolls (Continued)

is 0.5 to 10 mm, wherein the compaction rolls operate at a speed of 3 to 30 rpm, wherein an applied pressure of the roll compactor is 0.5 to 5 MPa, and milling the densified polymer material to obtain a densified polymer powder, wherein a bulk density of the densified polymer powder is greater than or equal to 250 kg/m3.

16 Claims, 2 Drawing Sheets

(51) Int. Cl.
| | |
|---|---|
| B29B 9/16 | (2006.01) |
| B29B 9/08 | (2006.01) |
| B29B 9/02 | (2006.01) |
| C08J 3/12 | (2006.01) |
| C08J 3/14 | (2006.01) |
| C08J 3/20 | (2006.01) |
| C08K 5/18 | (2006.01) |
| C08K 5/526 | (2006.01) |
| B29K 69/00 | (2006.01) |
| B29K 105/00 | (2006.01) |

(52) U.S. Cl.
CPC ............... *B29C 48/022* (2019.02); *C08J 3/12* (2013.01); *C08J 3/14* (2013.01); *C08J 3/201* (2013.01); *C08K 5/18* (2013.01); *C08K 5/526* (2013.01); *B29K 2069/00* (2013.01); *B29K 2105/0032* (2013.01); *B29K 2105/0044* (2013.01); *C08J 2369/00* (2013.01)

(56) References Cited

U.S. PATENT DOCUMENTS

| | | | |
|---|---|---|---|
| 3,505,273 A | 4/1970 | Cleveland et al. | |
| 3,508,339 A | 4/1970 | Neblett et al. | |
| 4,209,912 A | 7/1980 | Barker | |
| 4,248,819 A | 2/1981 | Mayer et al. | |
| 4,434,118 A * | 2/1984 | Lin | ......................... B29B 11/12 264/109 |
| 4,436,682 A | 3/1984 | Knopp | |
| 4,568,418 A | 2/1986 | Walko et al. | |
| 4,634,761 A | 1/1987 | Mendiratta et al. | |
| 5,306,807 A | 4/1994 | Kailasam et al. | |
| 5,317,083 A | 5/1994 | Freitag et al. | |
| 5,593,619 A * | 1/1997 | Bottelberghe | ......... C09K 21/08 100/38 |
| 5,615,831 A | 4/1997 | Molezzi et al. | |
| 5,786,445 A | 7/1998 | Wulff et al. | |
| 5,852,157 A | 12/1998 | Zaby et al. | |
| 6,328,919 B1 | 12/2001 | Pham et al. | |
| 6,362,304 B1 | 3/2002 | Hollar, Jr. et al. | |
| 6,489,372 B1 | 12/2002 | He et al. | |
| 2008/0033132 A1* | 2/2008 | Schlipf | ..................... B29B 9/02 526/255 |
| 2014/0295363 A1 | 10/2014 | Sun et al. | |

FOREIGN PATENT DOCUMENTS

| | | |
|---|---|---|
| JP | 2004114431 | 4/2004 |
| WO | 2013175448 A1 | 11/2013 |
| WO | 2014072923 A1 | 5/2014 |
| WO | 2014095676 A1 | 6/2014 |

OTHER PUBLICATIONS

International Search Report for International Application No. PCT/IB2015/058424; International Filing Date Oct. 30, 2015; dated May 3, 2016; 9 pages.

Written Opinion of the International Search Report for International Application No. PCT/IB2015/058424; International Filing Date Oct. 30, 2015; dated May 3, 2016; 9 pages.

* cited by examiner

PROCESS FOR MANUFACTURING A DENSIFIED POLYMER POWDER, AND PROCESS OF MELT PROCESSING A DENSIFIED POLYMER POWDER

CROSS REFERENCE TO RELATED APPLICATIONS

This application is a National Stage application of PCT/IB2015/058424, filed Oct. 30, 2015, which claims the benefit of U.S. Provisional Application Nos. 62/218,163, filed Sep. 14, 2015 and 62/076,850 Nov. 7, 2014, all of which are incorporated by reference in their entirety herein.

TECHNICAL FIELD

This disclosure relates to a densified polymer powder, methods of making, methods of using, pellets and articles made therefrom.

BACKGROUND

Conventional methods for the manufacture of thermoplastic polymer compositions from the polymer and the various additives used in the compositions generally include blending the polymer and one or more additives; melting or softening the blend in an extruder, optionally together with incorporating further additives; extruding the molten or softened polymer composition through a die; and cooling the extrudate. The extrudate is often chopped or otherwise formed into pellets. The thermoplastic polymer for blending is often provided in particulate form. There remains an ongoing need in the art for methods for producing thermoplastic polymer particulates that are readily processable, and that can provide, for example, reduced shipping and storage costs.

BRIEF DESCRIPTION

Disclosed herein is a process for manufacturing a densified polymer powder and the powders made therefrom.

In an embodiment, a process for manufacturing a densified polymer powder comprises compressing a polymer feed that has a bulk density of less than or equal to 240 kg/m$^3$ in a roll compactor comprising at least two compaction rolls to obtain a densified polymer material, wherein a gap between the two rolls is 0.5 to 10 mm, wherein the compaction rolls operate at a speed of 3 to 30 rpm, wherein an applied pressure of the roll compactor is 0.5 to 5.0 MPa; and milling the densified polymer material to obtain a densified polymer powder, wherein a bulk density of the densified polymer powder is greater than or equal to 250 kg/m$^3$.

The above described and other features are exemplified by the following figures and detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
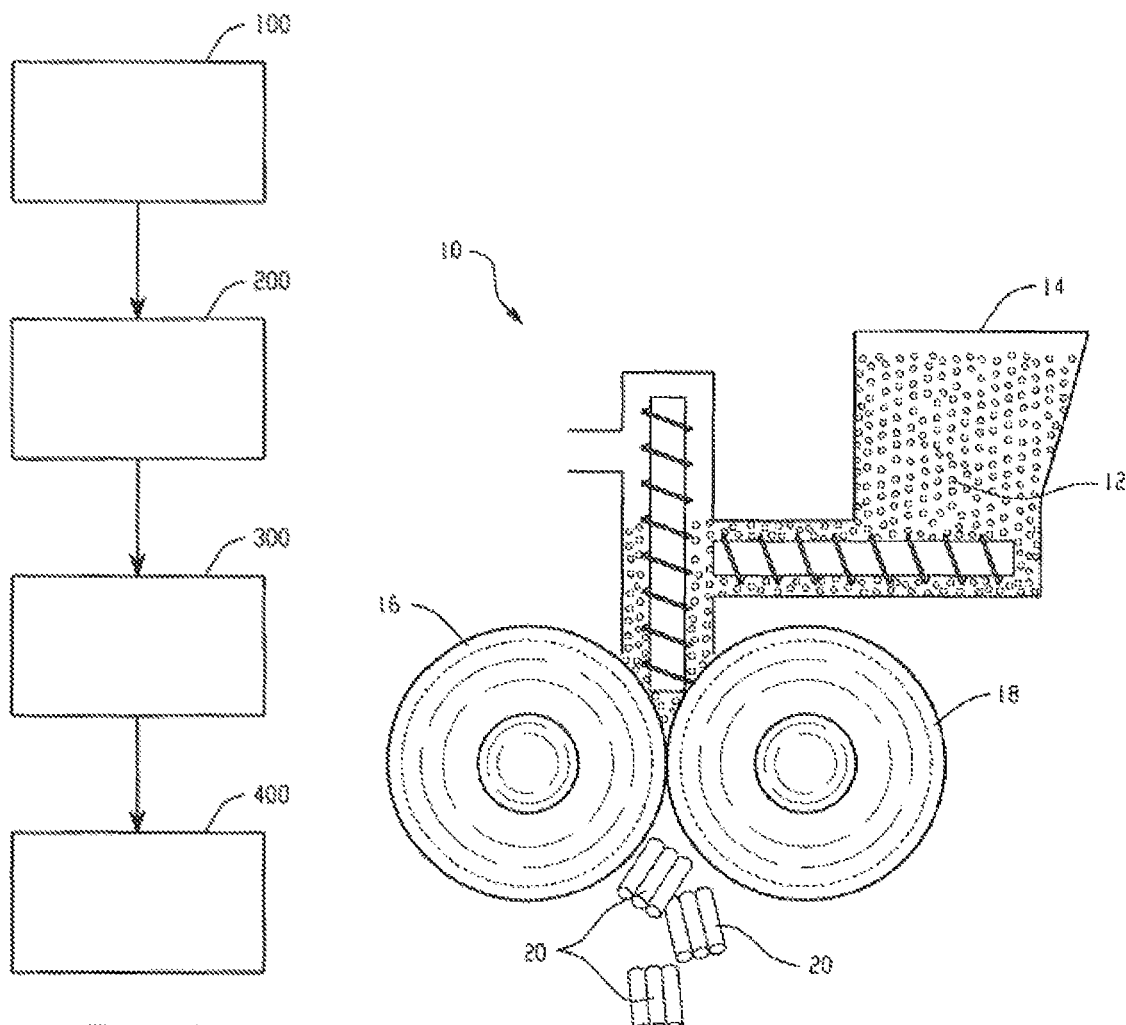
FIG. 1 is an illustration of an embodiment of a powder compaction process.

Polymerization methods of producing polymers, for example, the interfacial polymerization of polycarbonate, can result in powders with low bulk density values, for example, less than 240 kilograms per cubic meter (kg/m$^3$). These low densities can lead to inefficiencies in packaging, shipping, storing, and processing the polymer. For example, in the manufacture of the polymer compositions, a low bulk density can be associated with difficulties in feeding the polymer powder in extrusion operations. The low densities can inhibit or prevent the processing in the extruder from reaching a steady state, which can result in inconsistent pellet size and difficulties in cutting pellets from extrudate strands. Inconsistency in the particle size or density of the polymer powder can further lead to inefficiencies in the manufacture of polymer compositions. Low density and inconsistent particle size are often seen in processes where the polymer powder has been produced or isolated by steam precipitation, hot water precipitation, and the like.

To overcome these disadvantages, disclosed herein is a process for manufacturing a densified polymer powder. The process includes compressing a polymer feed in a roll compactor to obtain a densified polymer material; and milling at least a portion of the densified polymer material to obtain a densified polymer powder, wherein a bulk density of the densified polymer powder is greater than a bulk density of the polymer feed. The bulk density of the densified polymer powder can be greater than or equal to 250 kg/m$^3$, or greater than or equal to 285 kg/m$^3$, or greater than or equal to 310 kg/m$^3$, or greater than or equal to 330 kg/m$^3$. The densified polymer powder can be shipped and stored more efficiently as compared to a polymer powder with a lower density.

Furthermore, it was surprisingly discovered that melt processing, for example, via extrusion of the densified polymer powder had unexpected benefits as compared to processing of the same polymer powder, but that was not densified (herein referred to as standard or polymer feed). For example, as compared to a standard polymer powder, extrusion of the densified powder when extruded under the same conditions can result in one or more of a better cone development in a feed hopper (i.e., no bridging or holing is observed), better strand control, an increase in amp loading (for example, of greater than or equal to 10%, or greater than or equal to 14%), and an increase in volume throughput through the extruder (for example, of greater than or equal to 50%) in a given amount of time. Pellets made from both the densified and the standard polymer can weigh the same per unit volume, where, for example, weighing the same per unit volume can mean that the weight per unit volume is within 10%, or within 5%, or within 1% of each other.

It was further surprisingly found that the extruded densified polymer can have one or more of a reduced yellowness index (YI), an improved transparency, a better retention of one or both of volatile additives (such as benzotriazoles and phosphites), and a reduced oxidation of quinone type colorants as compared to an extruded standard polymer of the same composition. For example, a molded article of the densified polycarbonate can have a transmission level greater than or equal to 90.0% at 2.5 millimeter (mm) thickness as measured by ASTM D1003-00 Procedure B using CIE standard illuminant C, with diffuse illumination and unidirectional viewing. The molded article of the densified PC can have a YI of less than the YI of the feed polycarbonate. The molded article of the densified PC can have a YI of less than or equal to 1.5. YI as used herein is measured by ASTM D1925-88.

FIG. 1 illustrates a powder compaction process, where a polymer powder is taken from powder storage 100 to a powder feeder 200. From powder feeder 200, the powder is compacted in powder compactor 300 and sent to powder mill 400.

The polymer feed can be in any form that can be fed to the compaction rolls 16, 18. An as-manufactured polymer can be processed prior to densification to provide particulates or powders that can be readily fed to compaction rolls 16, 18. The polymer feed can comprise less than or equal to 5 wt % water, or less than or equal to 1 wt % water, or 0.3 to 0.5 wt % water based on the total weight of the feed. When the polymer feed comprises an interfacial polycarbonate, the feed can comprise less than or equal to 10 parts per million by weight (ppm), or 0.0001 to 10 ppm (e.g., 0.0001 to 5 ppm) of water immiscible solvent (such as methylene chloride) based on the total weight of the polymer feed. When the polymer is fed using hopper 14, the polymer feed can be free-flowing. The upper limit of the particle size can be determined by the desired thickness of the densified material. For example, while a broad range of particle sizes can be used, the polymer feed can have an average particle diameter of 100 micrometers (μm) to 5 mm, or 200 μm to 1 mm or 200 μm to 900 μm.

Figure 2:
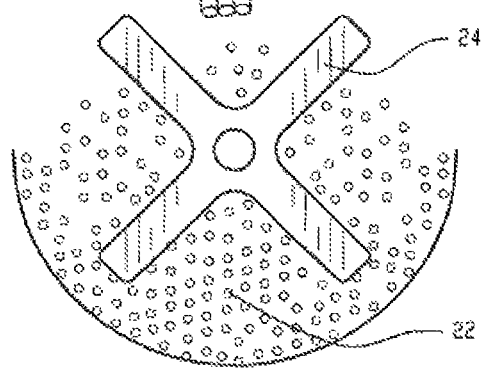
FIG. 2 is an illustration of an embodiment of a roll compactor and mill for producing densified powders.

FIG. 2 illustrates a process for manufacturing a densified polymer powder, which shows a schematic view of roll compactor and mill 10. FIG. 2 illustrates that polymer powder feed 12 is fed from feed hopper 14 to a gap (also known as a nip) between a pair of cooperatively rotating compaction rolls 16, 18. The polymer feed can be fed via a screw feeder at a rate of 30 to 200 revolutions per minute (rpm), or 50 to 150 rpm. During the operation, the circumferential speed of compaction rolls 16, 18 can be equal to (for example, within 5% of) the linear speed of exiting the densified polymer material. Compaction rolls 16, 18 compact the polymer and cause them to coalesce into densified polymer material 20, which emerge from the gap. Polymer material 20 can be fed to a subsequent one or more set(s) of compaction rolls (not shown) for further densification. Polymer material 20 is then granulated in granulator 24 to form densified polymer powder 22.

Densified polymer material 20 can be withdrawn from between the rolls under tension at a force that is adjusted so as not to exceed the elastic limit of the resulting densified polymer material. Densified polymer material 20 can exit from between the rolls based on the force of gravity. Densified polymer material 20 can be withdrawn from between the rolls as facilitated by a breaker that prevents the materials from breaking.

The size of the gap between compaction rolls 16, 18 can vary depending on the diameter of the compaction rolls and the desired thickness of the densified polymer material. The gap can be 0.5 to 10 mm, or 1 to 5 mm. For a given roll diameter, the amount of the polymer feed pulled into the gap can also determine the thickness of the densified polymer material. Thus, the feed mechanism from hopper 14 can be designed to control the thickness of the polymer feed between the compaction rolls by supplying the polymer feed at a certain rate. The compaction rolls can operate at a speed of 3 to 30 rpm, or 6 to 20 rpm.

The surface of the compaction rolls can be flat or textured, for example, to facilitate the feeding of the polymer powder. In general, the coarser the surface of compaction rolls 16, 18, the more of the polymer feed will be pulled into the nip of the rolls. The compaction roll surfaces can have a textured surface, wherein the textured surface comprises a height from a peak to a valley of 0.4 to 4 μm, or 1.6 to 2.4 μm. The compaction roll surfaces can be provided with a slight convex crown. For example, when forming a 15 centimeter (cm) wide, 0.0125 cm thick polymer material using 30 cm long, 15 cm diameter stainless steel compaction rolls, a 0.00125 cm convex crown can be used. The choice of other suitable crowns can depend on factors such as the type of the polymer powder, the thickness of the densified material, the roll speed, the roll pressure, and temperature.

The compressing of the polymer feed can be carried out at a temperature below the melting point of the polymer but high enough to facilitate densification. The temperature of the polymer feed can be controlled by the temperature of the compaction rolls. The temperature at which the compaction rolls are heated to achieve a set temperature of the polymer feed can depend upon the circumferential speed of the compaction rolls; for example, the faster the speed, the higher the temperature of the rolls, and vice versa. The temperature of the compaction rolls ($T_r$) can be at least 20° C. below the glass transition temperature of the polymer feed ($T_r \leq Tg-20°$ C.). The temperature of the compaction rolls can be 0 to 270° C., or 15 to 250° C., or 20 to 125° C. It was surprisingly found that the compressing of the polymer feed can be performed at an ambient room temperature, for example, of 15 to 30° C., or 20 to 25° C. without actively heating the compaction rolls.

The pressure applied to the polymer feed by the compaction rolls can affect the properties of the densified polymer material, in particular the density and tensile strength of the material. The pressure exerted by the compaction rolls can be controlled so as to be sufficiently high to achieve densification of the polymer product compared to the polymer feed. The applied pressure in the roll compactor can be 0.5 to 5 megapascal (MPa), or 0.75 to 5 MPa, or greater than or equal to 1 to 5 MPa, or 3.5 to 5 MPa. The densified polymer powder can have a density of at least 20%, at least 50%, at least 80% greater than the density of the polymer in the polymer feed. As is clear from the examples below, the densified polymer powder can have a density of at least 150%, or at least 200%, and even at least 215% greater than the density of the polymer in the polymer feed (e.g., standard polymer). It was surprisingly found that the increase in powder density was not linear with the applied pressure. For example, at applied pressures of greater than 5 MPa, the increase in powder density was no longer linear. It was further found that the trend of the increase in the density with pressure of a steam precipitated polycarbonate powder drops off at a maximum pressure (for example, at a pressure of greater than 5 MPa) giving little additional densification.

The tensile strength of the polymer material can be maintained at a value of within 10% or within 5% of a tensile strength of the polymer feed. Maintaining the tensile strength can result in a decreased energy and/or time in the subsequent granulation step.

The densified polymer material can then be granulated, for example, by milling. The milling can be carried out with a mechanical mill. Examples of the mechanical mill include impact type mills such as a cutter mill, a hammer mill, a pin mill, a jet mill, and grinding type mills, which mill a material with a shear force generated by a rotating blade and a peripheral stator. The milling temperature can be −200 to +100° C. For example, the milling can be freeze milling, wherein the temperature can be −200 to −100° C. Conversely, the milling can be carried out at a temperature of 0 to 100° C., or 0 to 50° C., or 10 to 30° C., or 15 to 30° C. The milling temperature can be within 10% of the temperature of the material leaving the roll compactor. The milling temperature can be less than or equal to the glass transition temperature (Tg) of the polymer minus 5° C., or less than or equal to the Tg minus 10° C., or less than or equal to the Tg minus 20° C., or less than or equal to the Tg minus 30° C. Tg can be determined as per ASTM D7426-08(2013).

The particle size distribution of the densified polymer powder can be quantified by determining one or more of the D10, D50, and D90 values. D10 refers to the particle diameter at which 10% of the particles by volume is comprised of smaller particles. The D10 value of the densified polymer powder can be a value of greater than or equal to 100 µm, or 100 to 600 µm, or 300 to 600 µm, or 300 to 500 µm. The D50 refers to the particle diameter at which 50% of the particles by volume is comprised of smaller particles. The D50 value can be a value of 500 to 3,500 µm, or 1,000 to 2,000 µm, or 1,000 to 1,500 µm or 1,500 to 2,000 µm. D50 can also refer to median diameter by volume. D90 refers to the particle diameter at which 90% of the particles by volume is comprised of smaller particles. The D90 value can be a value of 2,000 to 8,000 µm, or 2,800 to 4,000 µm, or 3,500 to 4,000 µm, or 2,800 to 3,200 µm. The particles can have an aspect ratio of a longest axis to a shortest axis of greater than or equal to 1.5, or greater than or equal to 2, or greater than or equal to 3 or 5.

The densified polymer powder can be further densified in a second densification process where the polymer feed can comprise the densified polymer powder to result in a densified polymer powder comprising a double compacted polymer powder. The density of the double compacted polymer powder can be greater than the density of the densified polymer powder. While second pass densification has some benefits, it was surprisingly discovered that most of the increase in densification was achieved in the first compaction. In some instances, over 70% of possible densification, without meting the resin, was achieved in the first pass densification.

The densified polymer powder can be screened to produce powders with narrow particle size distributions. The screen can have openings that can be spherical, elliptical, hexagonal, triangular, and the like. The openings can have an area, where a circle of the same area can have a diameter of less than or equal to 10 mm, or less than or equal to 7 mm, or less than or equal to 5 mm, depending on the size scale desired.

After the milling, ultrafine or fibrous particles can be removed by air classifying. The range of classification can be 1 to 40 wt %, or 1 to 20 wt %, or 2 to 10 wt %, or 5 to 30 wt %. Thus, the ultrafine and fibrous particles can be removed in a percentage of 3 to 40 wt % based on the total weight of the particles. After milling, coarse particles can be removed by air classifying. The classified ultrafine and fibrous particles can be used as a polymer feed for compressing and/or classified coarse particles can be recycled to the mill.

The densified polymer can have little change in the molecular weight as compared to the polymer feed prior to densification, where the change in molecular weight can be less than 20%, or less than 10%, or less than 5%. The densified polymer can have the same molecular weight as compared to the polymer feed prior to densification.

The densified polymer powder can then be melt processed, for example, in an extruder, optionally with one or more additives.

The powders produced by the process are densified as compared to the polymer feed. This higher bulk density can have several advantages. In transportation and packaging, it can reduce the number of containers required to move the material, resulting in cost savings. Higher bulk density can reduce the amount of equipment associated with processing the powder in finishing plants, e.g., silos. Low bulk density is typically associated with difficulties in feeding the powder in extrusion operations, whereas higher bulk densities can improve the feed rate and eliminate bottlenecks in extruder rates. Low bulk density can contribute to pellet color issues due to feed behavior at the extruder and thus the color of the polymer compositions can be improved. For example, and without being bound by theory, low bulk density powders can bridge and/or feed slowly and inconsistently, causing unsteady and fractional filling of the extruder. This in turn can cause air to be transported into the extruder which can increase the YI of the pellets. Entrained air can cause one or both of oxidation and decomposition of phosphorus and sulfur based stabilizers as well as decomposition of reactive colorants such as various quinone based colorants.

The process can provide a densified polymer with one or both of a uniform bulk density and a uniform particle size, which can also improve feed into an extruder. As used herein, a uniform size can refer to an average particle size having a standard deviation of less than or equal to 10% of the average particle size and a uniform density can refer to an average density having a standard deviation of less than or equal to 10% of the average density. The bulk density of the densified polymer powder can be greater than or equal to 250 $kg/m^3$, or greater than or equal to 285 $kg/m^3$, or greater than or equal to 310 $kg/m^3$, or greater than or equal to 330 $kg/m^3$. The bulk density of the densified polymer powder can be 250 to 330 $kg/m^3$ or 250 to 400 $kg/m^3$. A tap density of the densified polymer powder can be 1.2 to 1.4 times the bulk density, and wherein the bulk density can be 250 to 400 $kg/m^3$.

The polymer feed can comprise a polymer such as a thermoplastic polymer. The polymer can comprise a polycarbonate (PC); a polyetherimide; or a combination comprising one or more of the foregoing, such as PC copolymers (e.g., PC-PE, PC-PE-polysiloxanes), and polyetherimide copolymers (e.g., polyetherimide-polysiloxanes). The PC can comprise a bisphenol A(BPA) homopolymer; a copolymer comprising bisphenol A units, and one or more of 3,3-bis(4-hydroxyphenyl) phthalimidine units, 2-phenyl-3,3'-bis (4-hydroxy phenyl) phthalimidine (PPPBP), 1,1-bis (4-hydroxy-3-methylphenyl)cyclohexane units, and isophorone bisphenol units; or a combination comprising one or more of the foregoing. The PC can comprise a halogenated PC, for example, a brominated PC. PC-PE copolymers can include carbonate units derived from BPA and at least one of BPA arylate ester units, aliphatic arylate ester units, resorcinol arylate ester units. PC-PE-polysiloxanes can comprise BPA units, resorcinol isophthalate/terephthalate ester (ITR) units, and dimethylsiloxane units. Specific polyetherimides include those containing units derived from bisphenol A and meta- or para-phenylene diamine specific polyetherimide-polysiloxanes include those containing etherimide units derived from BPA and meta- or para-phenylene diamine, and DMS units. The polymer can comprise PE, for example, polyethylene terephthalate and polybutylene terephthalate. The polymer can comprise an elastomer, for example, acrylonitrile-butadiene-styrene (ABS). The polymer can comprise a polyphenyl ether such as one derived from diphenyl ether, diphenoxybenzene, thio-bis-phenoxy benzene, bis-phenylmercapto benzene, bis-phenoxyphenyl ether, bis-phenoxyphenyl benzene, bis-phenoxyphenoxy phenyl ether, or a combination comprising one or more of the foregoing. The polymer feed can comprise LEXAN™ 100 Grade, PPC, PCE, HFD, SLX, FST, XHT, EXL, or a combination comprising one or more of the foregoing all commercially available from SABIC's Innovative Plastics Business in their standard (low density) form. The polymer can comprise a PC copolymer, or a PE-PC copolymer, a polysiloxane-PC copolymer, a PC-isoindolinone copolymer, or a composition comprising at least one of the foregoing. The polymer can comprise a PE-PC copolymer, wherein the PE comprises a repeat unit derived from resorcinol. The polymer powder feed can comprise a combination comprising at least one of the foregoing polymers.

The polymer feed can comprise a BPA PC, for example, a BPA homopolymer.

The polymer feed can have a glass transition temperature of 130 to 290° C., or 140 to 200° C., or 140 to 160° C.

The polymer feed can have a halogen content of less than or equal to 500 ppm, or less than or equal to 150 ppm, or less than or equal to 100 ppm of a halogen based on the total weight of the polycarbonate. Halogen content, for example, bromine and chlorine content, can be determined by combustion analysis, mass spectroscopy, atomic emission spectroscopy, atomic absorption, inductively coupled plasma, and X-ray methods, such as x-ray fluorescence. Examples of such methods are ASTM methods D808, D6247, and D6349.

A "polycarbonate" means compositions having repeating structural carbonate units of formula (1), wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

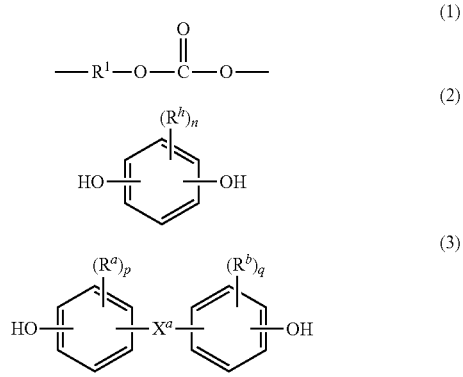

In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. p and q can each 0, or p and q can each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^e$)($R^d$)— wherein $R^e$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl) cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Some illustrative examples of dihydroxy compounds that can be used are described in WO 2013/175448 A1, US 2014/0295363, and WO 2014/072923.

The polyester, for example, the polyester-polycarbonate copolymer, has repeating units of formula (10), wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, or 2, 3, or 4 carbon atoms; and T is a divalent group derived from a dicarboxylic acid, and can be a $C_{2-10}$ alkylene group, a $C_{6-20}$ alicyclic group, a $C_{6-20}$ alkyl aromatic group, or a $C_{6-20}$ aromatic group. D can be a $C_{2-30}$ alkylene group having a straight chain, branched chain, or cyclic (including polycyclic) structure. Examples of aromatic dicarboxylic acids that can be used to prepare the polyester units include isophthalic or terephthalic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalene dicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. D can be a $C_{2-6}$ alkylene group and T can be p-phenylene, m-phenylene, naphthalene, a divalent cycloaliphatic group, or a combination thereof. This class of polyester includes the poly(alkylene terephthalates).

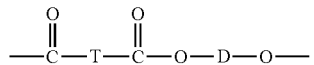

(10)

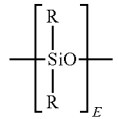

(11)

The polysiloxane, for example, and the polycarbonate-polysiloxane (such as the polycarbonate-polyester-polysiloxane terpolymer) comprises siloxane repeat units of formula (11), wherein each occurrence of R is the same or different, and is a $C_{1-13}$ monovalent organic group. Each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. Combinations of the foregoing R groups can be used in the same copolymer. The polysiloxane can comprise R groups that have a minimum hydrocarbon content, for example, the R groups can be methyl groups. E can have an average value of 4 to 50, or 16 to 50, or 20 to 45, or 25 to 45. E can have an average value of 4 to 15, or 5 to 15, or 6 to 15, or 7 to 12.

The polycarbonates can contain branched polycarbonate(s). Various types of branching agents can be utilized for embodiments encompassed by this disclosure. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. Examples of specific branching agents that are particularly effective in embodiments include trimellitic trichloride (TMTC), tris-p-hydroxy phenyl ethane (THPE) and isatin-bis-phenol. The branching agents can be added at a level of 0.05 to 2.0 wt % based on the total weight of the polycarbonate. The amount of branching agent can provide 0.1 to 10 branching units per 100 $R^1$ units, or 0.5 to 8 branching units per 100 $R^1$ units, or 0.75 to 5 branching units per 100 $R^1$ units. Mixtures comprising linear polycarbonates and branched polycarbonates can be used.

A particular type of branching agent can be used to create branched PC materials. These branched polycarbonate materials have statistically more than two end groups. The branching agent is added in an amount (relative to the bisphenol monomer) that is sufficient to achieve the desired branching content, that is, more than two end groups. The molecular weight of the polymer can become very high upon addition of the branching agent and can lead to viscosity problems during phosgenation. Therefore, a chain termination agent can be used in the polymerization. The amount of chain termination agent used when the particular branching agent is used is generally higher than if only a chain termination agent alone is used. The amount of chain termination agent used can be above 5 mole percent (mol %) and less than 20 mol % compared to the bisphenol monomer.

A chain stopper (also referred to as an end capping agent) can be included during polymerization. The chain stopper limits molecular weight growth rate, and so controls molecular weight in the polycarbonate. Examples of chain stoppers include certain mono-phenolic compounds, mono-carboxylic acid chlorides, and/or mono-chloroformates. Mono-phenolic chain stoppers are exemplified by monocyclic phenols such as phenol and $C_{1-22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_{1-22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The end-capping agents can be selected from at least one of the following: phenol or a phenol containing one or more substitutions with at least one of the following: aliphatic groups, olefinic groups, aromatic groups, halogens, ester groups, and ether groups. The end-capping agents can be selected from at least one of the following: phenol, para-t-butylphenol, or para-cumylphenol. The polymer can comprise a polycarbonate with a low phenolic end group concentration, for example, less than or equal to 500 ppm, or less than or equal to 150 ppm, or less than or equal to 100 ppm, or less than or equal to 20 ppm based on the total weight of the polycarbonate. The polymer can comprise a polycarbonate with a low phenolic end group concentration, for example, less than or equal to 50 ppm, or less than or equal to 30 ppm based on the total weight of the polycarbonate. The concentration of the phenolic groups can be analyzed by titration and spectroscopic method such as infrared and nuclear magnetic resonance. Derivatives of the polymer end groups can be made in order to enhance the measurement sensitivity. It can be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987). The polycarbonate powder can have carbamate end group content of less than or equal to 10 ppm based on the total weight of the polycarbonate. An endcapping agent can be employed in the reaction such that the resultant composition comprising polycarbonate comprises a free hydroxyl level less than or equal to 150 ppm, or 25 to 150 ppm, or 30 to 100 ppm based on the total weight of the polycarbonate.

The polycarbonate can be polymerized by an interfacial polymerization process. Although the reaction conditions for interfacial polymerization can vary, an exemplary process generally involves dissolving or dispersing a dihydric phenol reactant (also referred to as a dihydroxy compound) in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The water immiscible solvent can have a boiling point of less than or equal to 80° C. The water immiscible solvent can have a water solubility at 23° C. of less than or equal to 5 wt %, or less than or equal to 1 wt %. The most commonly used water immiscible solvents include methylene chloride, 1,2-dichloroethane, chlorobenzene, toluene, and the like.

In general, interfacial polymerization of polycarbonate utilizes a polymerization unit that can comprise a continuously stirred tank reactor(s) (CSTR), a centrifuge(s) (such as a disc-type centrifuge and a CINC™ centrifuge), a heat exchanger(s), a decanter(s), a separating coalescer(s), an extraction column(s), a devolatilizer(s), an extruder(s), a scrubber(s), a filter(s), or combinations comprising one or more of the foregoing. For example, the polymerization unit can comprise one or more CSTRs that can each independently act as a polymerization vessel. When more than one CSTR is present, they can be operated in a continuous mode.

Among the phase transfer catalysts that can be used are catalysts of the formula $(R_3)_4Q^+X$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. An effective amount of phase transfer catalyst can be 0.5 to 2 wt % based on the weight of bisphenol in the phosgenation mixture.

The dihydric phenol reactant can be of very high purity and very low color, e.g., it can be at least 99.80 wt % pure. For example, when the dihydric phenol reactant comprises BPA, the BPA can be polycarbonate grade BPA. BPA can be produced in two grades, polycarbonate grade and epoxy grade. Polycarbonate grade BPA is higher purity and has a lower color, as measured by APHA at 325 nanometers (nm). Generally, high purity BPA has a measured APHA of less than 10 while lower purity, epoxy grade BPA has an APHA of greater than 40.

BPA can be produced by the condensation of phenol with acetone. Phenol can be used in excess, and many other impurities can be formed in the condensation reaction, such as the ortho,para isomer of BPA, other oligomers, and tar. The para,para-isomer can be distilled, and the excess phenol with byproducts can be recycled. Because the excess phenol can be recycled, the impurities can make their way into the BPA being produced. However, some commercial producers of BPA who make both epoxy grade BPA and PC grade BPA use only fresh inputs for a production line for producing PC grade BPA, and will send the recycle streams, for example, from the polycarbonate grade line to the epoxy grade line.

The BPA used to form the polycarbonate can have a purity of greater than or equal to 99.65 wt %, specifically greater than or equal to 99.80 wt % based on the total weight of the BPA. The organic purity can be defined as 100 wt % minus the sum of known and unknown impurities detected using ultraviolet (UV) (see HPLC method in Nowakowska et al., Polish J. Appl. Chem., XI(3), 247-254 (1996)). Such high quality bisphenol A is commercially available. The BPA for polycarbonates can be the para,para-isomer of BPA.

The BPA can have a sulfur level of less than or equal to 4 ppm, or less than or equal to 2 ppm, or, less than or equal to 1.5 ppm as measured by a commercially available Total Sulfur Analysis based on combustion and coulometric detection.

Methylene chloride can be used to form BPA. The methylene chloride can be purified by steam precipitation to reduce the amount of one or more of calcium, iron, salt, and degraded polymer. For example, the methylene chloride can comprise less than 10 ppm of calcium, less than 1 ppm of iron, less than 0.5 wt % salt, and/or less than 0.1 wt % degraded polymer; all based on the total weight of the methylene chloride.

The aqueous base can be aqueous sodium hydroxide (NaOH). NaOH can be used to maintain the reaction pH within a typical range of 9.5 to 10.0, and to neutralize the HCl formed from the reaction of BPA with phosgene (turning the water into brine). NaOH can be made by the electrolysis of sodium chloride. One impurity formed in the electrolysis and present in the NaOH is sodium chlorate (NaClO$_3$). The amount of NaClO$_3$ can be reduced by reacting the NaOH stream with hydrogen using a ruthenium catalyst supported on carbon. However, it is not possible to guarantee that all the NaClO$_3$ present is reacted, so some can remain in the treated NaOH solution. NaClO$_3$ is an oxidant and has been demonstrated to react with BPA. While the reaction products of NaClO$_3$ with BPA have not been completely characterized, it is believed that the oxidation of the phenol group of BPA causes the formation of quinone structures, which are typically highly colored. It has been demonstrated that producing PC using NaOH with high levels of NaClO$_3$ results in a resin that, when molded is high in color and has poor color stability. The NaOH used in the present disclosure can contain less than 10 ppm of NaClO$_3$. Additionally, solid particulates can be removed from the NaOH solution by filtration using 10 micrometer absolute media.

High quality phosgene can be used in the polymerization of the polycarbonate. Phosgene can be produced by the reaction of carbon monoxide and chlorine. This reaction is typically run with an excess of carbon monoxide, which is inert in the interfacial polymerization. However, small amounts of un-reacted chlorine can be present in the phosgene. Chlorine can react with NaOH in the interfacial polymerization reaction to produce sodium hypochlorite (NaClO), which can react with BPA in a manner similar to NaClO$_3$. The chlorine can also react directly with BPA that can result in chlorination of the polymer backbone. Polycarbonate produced when free chlorine levels in the phosgene are greater than 500 ppm can result in a polycarbonate that can have greater than 200 ppm bound chlorine atoms. This polycarbonate can have increased YI and decreased color stability. The level of incorporated chlorine atoms in the polycarbonate can be less than 20 ppm when phosgene containing less than 100 ppm free chlorine is used. Thus, it is important to control the amount of chlorine introduced via phosgene.

The reaction of phosgene with BPA to produce the PC powder can be run with phosgene to ensure complete molecular weight build and minimize the amount of residual, un-reacted BPA monomer. Generally, an 8 to 10 mol % excess phosgene can be used.

After the polymerization, the polycarbonate can be fed to a purification system to separate the organic phase comprising the polycarbonate from the aqueous phase and to purify the organic phase from impurities such as salts, ions, and the interfacial catalyst. The purification system can comprise a centrifuge(s) (such as a disc-type centrifuge and a CINC™ centrifuge), a heat exchanger(s), a decanter(s), a separating coalescer(s), an extraction column(s), or a combination comprising one or more of the foregoing.

The purification system can comprise a devolatization step (such as a flash devolatization and/or a devolatization extrusion), a direct isolation step, a whipped film step, a dewatering extrusion step, a foaming devolatization step, or a combination comprising one or more of the foregoing. The devolatization can comprise a devolatization unit with an attached collection pot and melt pump.

The purification of the polycarbonate can be important in producing a low color and color stable polycarbonate. The reaction mixture, containing polycarbonate, brine, water immiscible solvent, and impurities, can be considered to be a batch. The batch can be discharged and purified through a series of purifying stages. Each stage can be made up, for example, of one or more liquid-liquid centrifuges.

In a first purifying stage, the brine phase can be separated from the methylene chloride phase that contains dissolved polycarbonate. In a second purifying stage, the catalyst can be extracted from the methylene chloride phase by using dilute aqueous HCl. In a third purifying stage, residual ionic species can be removed by washing the methylene chloride phase using high quality water. High quality water has generally been condensed from the steam or has been purified using de-ionization, such that few contaminants are present in the water. For example, the conductivity of the high quality water can be less than 10 micro-siemens per centimeter (micro-siemens/cm). As a result, the polycarbonate can have low residual chloride ions. It has been shown that when water containing mineral and metal impurities such as calcium, silicate, iron, sulfate, or the like is used, molded parts made from the subsequent polycarbonate can have increased haze and yellowness.

The dichloromethane and steam vapors can be separated from the wet polycarbonate. The dichloromethane and steam vapors can themselves be condensed and separated. The recovered dichloromethane can be high purity by virtue of being flashed, and can be reused in future polymerization of BPA. The recovered water can also be high purity, and can be used in the purifying stages for washing or the extraction of catalyst. The recovered catalyst/water mixture can be reused in future polymerization of BPA.

Residual dichloromethane can be removed from the wet polycarbonate in a plug flow column using counter current steam flow. Residual water can be removed from the wet PC in a fluid bed dryer using heated air. The resulting PC powder can then be collected.

To summarize, a number of steps can be taken to produce high quality polycarbonate. High purity BPA that is low color and especially color stable can be used. The NaOH base can be low in sodium chlorate content and can be filtered. The phosgene can be low in non-reacted chlorine content. Conservative reaction conditions that ensure complete polymerization can be used. High purity water should be used during the purifying stages of obtaining the polycarbonate (PC).

The interfacial polycarbonate can be recovered by steam precipitation of a 20 to 60 wt % polycarbonate solution in a solvent with a boiling point of 40 to 90° C. and a miscibility with water of less than 5 wt %. The solvent can comprise methylene chloride, chloroform, carbon tetrachloride, dichloro ethane, trichloro ethane, dichloro ethylene, trichloro ethylene, chloro propane, dichloro propane, fluoro chloro propane, chloro propene, dichloro propene, fluoro chloro propene, toluene, chlorobenzene, or a combination comprising at least one of the foregoing.

The polycarbonate can then be concentrated and isolated by means of steam precipitation, which instantly flashes the dichloromethane solvent during direct contact with steam. The steam used for precipitation can be very low in mineral and ion content, preferably with a conductivity value of less than one micro-siemens/cm. Precipitation of polycarbonate using steam with high mineral or ion content (greater than 10 micro-siemens/cm) can result in high yellowness and poor melt stability for the polycarbonate.

It is noted that the present process can be particularly advantageous for steam precipitated polycarbonates as such polycarbonates generally have a lower density as compared to polycarbonates isolated by other methods. Examples of steam precipitation methods are described in U.S. Pat. Nos. 3,508,339; 4,209,912; 4,568,418; 5,306,807; 5,317,083; 5,475,084; 5,615,831; 5,786,445; 5,852,157 and 6,362,304.

After purification, the non-aqueous phase containing the dissolved polycarbonate can be optionally filtered using 10 μm absolute filters.

The polycarbonate powder prior to densification can comprise less than or equal to 5 wt % water, or less than or equal to 1 wt % water based on the total weight of the feed.

The polycarbonate powder can comprise 5 to 100 ppm, or 5 to 20 ppm of methylene chloride based on the total weight of the feed.

The polycarbonate prior to densification can have a weight average molecular weight (Mw) of 5 to 100 kilodaltons (kDa), or 17 to 35 kDa, or 15 to 50 kDa as determined by gel permeation chromatography (GPC) based on polycarbonate standards. Mw can be determined in accordance with ASTM D5296.

The densified polymer can be extruded, for example, in a single screw extruder or in a twin screw extruder, for example, an intermeshing twin screw extruder. Examples of extruders are compound extruders, sheet and film extruders, profile extruders, and molding machines. The extruder can be a single or twin screw extruder with a screw length/diameter (L/D) ratio from 20:1 to 60:1, or 30:1 to 40:1 and a screw diameter of 1 to 21 cm. The extruder can be a single screw extruder having a screw diameter from 1 to 21 cm that is part of a thermoplastic molding machine. The single screw extruder can comprise at least one of the following: an injection molding machine, a blow molding machine, an injection-blow molding machine, an extrusion-blow molding machine, a stretch-blow molding machine, a gas assist molding machine, a hydraulic molding machine, a mechanical molding machine, and an electric molding machine.

The extruded densified polymer can have little change in the molecular weight as compared to the densified polymer entering the extruder, where the change in molecular weight can be less than 20%, or less than 10%, or less than 5%. Desirably, the extruded densified polymer has the same molecular weight as compared to the densified polymer entering the extruder.

The extruder can extrude the densified polymer to produce polymer pellets. As used herein, the term "pellet" refers to a solid material having length along at least one axis of greater than or equal to 2 mm. Pellet size can be measured by any conventional method including physical measurement of a representative group of pellets using a ruler or caliper. Pellet size can also be measured by sieving pellets through a mesh or screen of a known dimension using, for example, ASTM D1921-12. The polymer pellets can have an increased bulk density as compared to that of densified powder. For example, a PC pellet bulk density can be 0.70 to 0.90 grams per cubic centimeter (g/cc). Bulk density can be measured by ASTM D1895 test methods B and C. The pellet(s) can be of any shape or form such as cylinders, cubes, hemispheres, or ovoids. The pellets can be cylinders that have an average length of 2 to 6 mm with an average diameter of 0.5 to 4 mm.

Extrusion of a densified polymer powder can result in a reduced energy consumption of greater than or equal to 10% when compared to extrusion under the same conditions of the undensified powder of the same composition. Here, it was surprisingly discovered that a densified polycarbonate powder containing less air can heat faster as there is less entrapped air, which can act as an insulator and preventing proper heat transfer from the extruder. Further, the presence of less air during melting and melt conveying can cause less oxidative degradation of the polymer with reduced yellowing and less consumption of antioxidants, such as hindered phenols and phosphites, which can be used to protect the composition in subsequent melt forming steps and in eventual end use applications.

The feed to the extruder can comprise the densified polymer and optionally an additive. The additive can include an impact modifier, a flow modifier, a filler (e.g., a particulate polytetrafluoroethylene (PTFE), glass, carbon, a mineral, or metal), a reinforcing agent (e.g., glass fibers), an antioxidant, a heat stabilizer, a light stabilizer, an ultraviolet (UV) light stabilizer, a UV absorbing additive (such as a benzotriazole), a plasticizer, a lubricant, a release agent (such as a mold release agent (such as glycerol monostearate, pentaerythritol stearate, glycerol tristearate, stearyl stearate, glycerol monopalmitate. and the like)), an antistatic agent, an anti-fog agent, an antimicrobial agent, a colorant (e.g., a dye or pigment), a surface effect additive, a radiation stabilizer, a flame retardant, an anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive (other than any impact modifier, filler, or reinforcing agent) can be 0.001 to 10.0 wt %, or 0.01 to 5 wt %, each based on the total weight of the polymer in the composition.

Antioxidant additives include organophosphites such as tris(nonyl phenyl) phosphite, tris(2,4-di-t-butylphenyl)phosphite, bis(2,4-di-t-butylphenyl) pentaerythritol diphosphite, distearyl pentaerythritol diphosphite; alkylated monophenols or polyphenols; alkylated reaction products of polyphenols with dienes, such as tetrakis [methylene (3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methyl phenyl)-propionic acid with monohydric or polyhydric alcohols; esters of thioalkyl or thioaryl compounds such as distearylthiopropionate, dilaurylthiopropionate, ditridecyl thiodipropionate, octadecyl-3-(3,5-di-tert-butyl-4-hydroxy phenyl)propionate, amides of beta-(3,5-di-tert-butyl-4-hydroxyphenyl)-propionic acid, pentaerythrityl-tetrakis[3-(3,5-di-tert-butyl-4-hydroxyphenyl) propionate; or combinations comprising at least one of the foregoing antioxidants. A phosphite additive can be present in the extruder feed in an amount of 0.1 to 1.0 wt % based on the total weight of the feed. The phosphite can comprise a triaryl phosphite with a molecular weight of 0.2 to 5 kDa.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, enthrones, tetrachloroisoindolinones, anthraquinones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

The pigment can comprise titanium dioxide. The titanium dioxide can comprise encapsulated titanium dioxide, for example, encapsulated in silica, alumina, a silane, or a combination comprising at least one of the foregoing. An example of a silane encapsulated titanium dioxide is DF1040 commercially available from Momentive Performance Materials. Such a material can be preferred for improved polycarbonate melt stability in opaque formulations. The encapsulated, passivated titanium dioxide can have a particle size of 0.1 to 8 micrometers, or 0.1 to 1 micrometers.

Dyes are generally organic materials and include coumarin dyes such as coumarin 460 (blue), coumarin 6 (green), nile red, or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinque phenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; pyrene, chrysene, rubrene, coronene, 3-diethylamino-7-diethylimino phenoxazonium perchlorate; 2-(1-naphthyl)-5-phenyloxazole; 2,2'-p-phenylen-bis(5-phenyl oxazole); rhodamine 700; rhodamine 800; or the like; or combinations comprising at least one of the foregoing dyes.

The colorants can comprise an anthraquinone or a napthaquinone moiety in the chemical structure and can further contain one or both of a phenolic OH (hydroxyl group) and an aryl amine functionality. The colorant can comprise Solvent Green 3 (R32P), Solvent Green 28 (R36), Solvent Red 52 (R63), Solvent Red 111 (R61), Solvent Red 207 (R666), Solvent Violet 13 (R71), Solvent Violet 36 (R72), Disperse Blue 72, Pigment Blue 60 (R7260), Vat Blue 4, Solvent Blue 97 (R73), Solvent Blue 101 (R773), Solvent Blue 104 (R75), Anthraquinone Blue (R774) Solvent Yellow 163 (R84), Pigment Red 117, Disperse Blue 14, or a combination comprising one or more of the foregoing.

Quinone based colorants can be added. Examples of quinone based colorants are structures (A)-(G), where Q is —OH, —NH$_2$, —NR$_2$, —NHR, —NHAryl, —N(Aryl)$_2$-, S—Ar, or —S—R. Each R independently can be an alkyl group, an aryl group, a halogen, a cyano group, a hydroxyl group. Each R independently can be a heteroatom containing group. The quinone of structure (A) can likewise have more than one Q unit in conjugation with the quinone moiety.

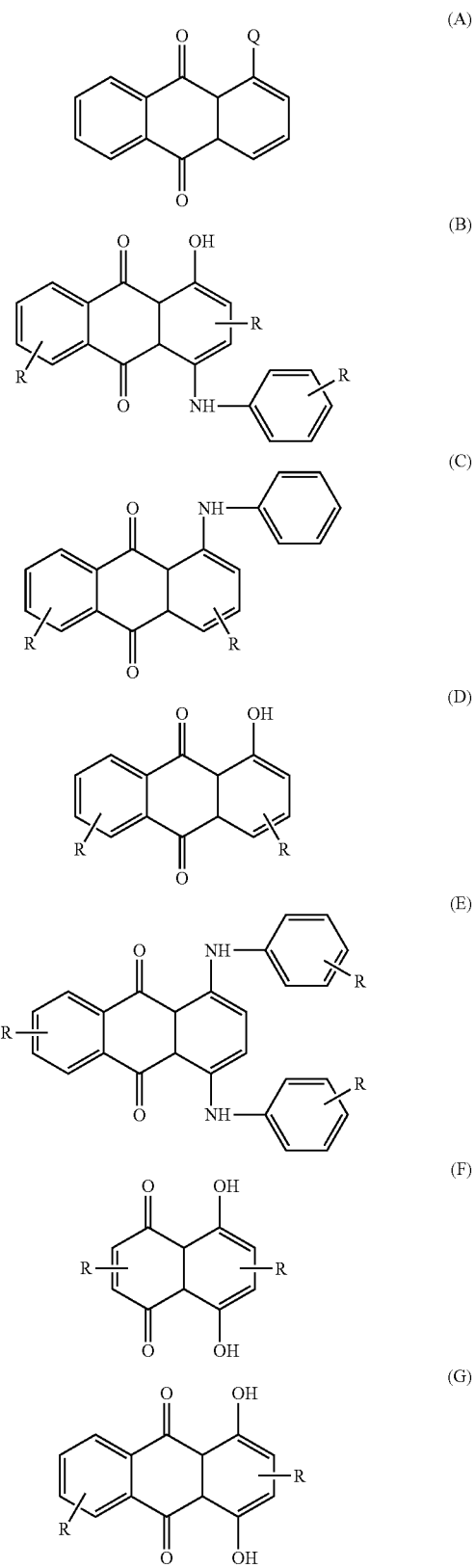

The following examples are provided to illustrate the process for manufacturing a densified polymer powder and pellets and articles made therefrom. The examples are merely illustrative and are not intended to limit devices made in accordance with the disclosure to the materials, conditions, or process parameters set forth therein.

EXAMPLES

In the Examples, the PC powder feed was isolated by steam precipitation from 15 to 50 wt % methylene chloride solutions, followed by water and methylene chloride removal in downstream dryer systems as described in U.S. Pat. No. 3,508,339.

MW was determined by GPC as per ASTM D5296-05 using PC standards. Tg was measured by differential scanning calorimetry (DSC) as per ASTM D7426-08(2013).

Powder densification was performed in a FITZPATRICK CHILSONATOR IR520 densification unit with a throughput of up to 50 kilograms per hour (kg/h). The CHILSONATOR was equipped with a roll compactor, a FITZMILL granulator, and a screener. The powder was densified at below 120° C.

Bulk and tap density of both the feed powder and the densified powder were obtained according to the following procedure as per ASTM D7481-09. The weight of a graduated dry cylinder was determined and recorded as $m_0$. 250 to 350 milliliters (mL) of powder was poured using a funnel into the dry cylinder; the unsettled apparent volume was recorded as V. The filled cylinder was then put in a vortex test tube mixer for 8 seconds to have powder settle in the cylinder. The settled volume was recorded as $V_s$. The mass of powder and cylinder after shaking was recorded as m. The bulk density was determined using the formula $(m-m_0)/V$ and the tap density was determined using the formula $(m-m_0)/V_s$.

Particle size distribution was determined using a SYMPATEC QICPIC analyzer equipped with dynamic image analysis sensor. During the analysis, highly dispersed powders were slowly fed into the analyzer and imaged. The particle size distribution was calculated using statistically relevant measurement results collected over a relatively short analysis time (450 images per second or 1,000,000 particles in 20 seconds). The particle size distribution was determined by volume.

Examples 1-2: Preparation of Densified Polycarbonate Powder

Two PC powders, PC1 (LEXAN™ 100 Grade; an interfacial BPA PC capped with about 3.5 mol % p-cumyl phenol based on the total moles of endgroups with a Tg of 149° C., Mw 29,900 Daltons (PC standards)) and PC2 (LEXAN™ XHT; an isoindolinone polycarbonate copolymer made from reaction of about 67 mol % BPA and 33 mol % N-phenyl phenolphthalein and an equal molar amount of phosgene to form carbonate linkages, Mw 24,000 Dalton (PC Standard), Tg of 185° C.); commercially available from SABIC's Innovative Plastics business; were densified in the densification unit under different roll compaction pressures. The PC had a phenolic end group content less than 20 ppm, a bromine or chlorine content of less than 100 ppm, an iron content of less than 10 ppm, and a carbamate end group content less than 10 ppm all based on the total weight of the PC.

Compaction pressure 1 for PC1 ($P1_{PC1}$) was 2.4 MPa, compaction pressure 2 for PC1 ($P2_{PC1}$) was 3.8 MPa, compaction pressure 1 for PC2 ($P1_{PC2}$) was 2.8 MPa, and compaction pressure 2 for PC2 ($P2_{PC2}$) was 3.4 MPa. The vertical feeding speed was 325 rpm. The roll speed was 6 rpm. The roll gap was 1.8 mm. The mill speed was 1,250 rpm. The densified powder was screened with a screen having round holes with a diameter of 9.5 mm. The results are shown in Table 1. The D10, D50, and D90 values for two separate PC1 feed samples were determined and are both listed in Table 1.

TABLE 1

| | Example | | | | | |
|---|---|---|---|---|---|---|
| | 1 | | | 2 | | |
| | Polymer | | | | | |
| | PC1 | | | PC2 | | |
| Sample | feed | $P1_{PC1}$ | $P2_{PC1}$ | feed | $P1_{PC2}$ | $P2_{PC2}$ |
| bulk density (kg/m³) | 191 | 336 | 404 | 139 | 312 | 335 |
| tap density (kg/m³) | 231 | 408 | 471 | 171 | 368 | 393 |
| D10 (micrometer) | 220-262 | 371 | 453 | 317 | 372 | 362 |
| D50 (micrometer) | 557-689 | 1,951 | 3,429 | 883 | 1,154 | 999 |
| D90 (micrometer) | 3,205-5,999 | 5,497 | 6,559 | 2,433 | 3,284 | 2,741 |

Table 1 illustrates that both the bulk density and the tap density of the polymer powders increase after densification and that increasing the roll pressure increases the density of the densified powder. Table 1 further illustrates that a higher densification after compaction was achieved with PC1 as compared to PC2. Without being bound by theory, it is believed that this increased densification is due to the higher transition temperature (Tg=185° C.) and the N-phenyl phthalide bisphenol structure of PC2 as compared to that of PC1 a bisphenol A polycarbonate with a Tg of 149° C.

Example 3-6: Extrusion of Densified Polycarbonate

Standard and densified PC powders were extruded in a twin screw extruder (28 mm, 4 barrel zones, 2 hole die, 457 to 635 mmHg vacuum, volumetric feeder run at the same rate for both extrusions). The extruder operated at 440 rpm and 70 to 80% torque for standard powder and 92 to 98% for densified powder. The four zones of the extruder were operated at temperatures of 177° C., 260° C., 271° C., and 288° C., for zones 1-4, respectively.

The PC powder of Example 3 was PC1; the PC powder of Example 4 was PC1 with 0.06 wt % tris(di-tert butyl phenyl) phosphite stabilizer; the PC powder of Example 5 was PC1 with 0.06 wt % tris(di-tert butyl phenyl) phosphite stabilizer and 0.005 wt % solvent violet 13; and the PC powder of Example 6 was PC1 with 0.005 wt % solvent violet 13.

TABLE 2

| | Example | | | | | | | |
|---|---|---|---|---|---|---|---|---|
| | 3 | | 4 | | 5 | | 6 | |
| Stabilizer (wt %) | — | | 0.06 | | 0.06 | | — | |
| Dye (wt %) | — | | — | | 0.005 | | 0.005 | |
| Type | S | D | S | D | S | D | S | D |
| Torque (%) | 82 | 99 | 80 | 91 | 80 | 88 | 79 | 89 |
| Kilograms per 15 min | 2.7 | 4.2 | 2.4 | 3.8 | 2.4 | 3.9 | 2.4 | 3.9 |

S = standard;
D = densified.

Table 2 illustrates that there is an increase in throughput through the extruder for the densified powders as compared to the standard powders of about 55 to 56%.

Examples 7-8: Yellowness Index of Extruded Densified Polycarbonate

TABLE 3

| Example | 7 | | 8 | |
|---|---|---|---|---|
| Sample | Standard (7S) | Densified (7D) | Standard (8S) | Densified (8D) |
| YI | 2.6 | 2.1 | 1.7 | 1.3 |

Figure 3:
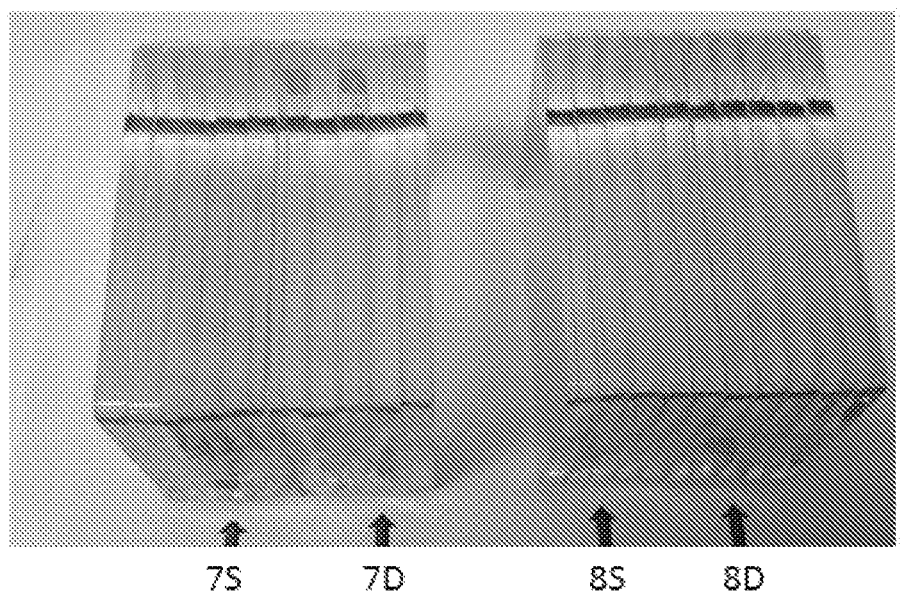
FIG. 3 is a photograph of polycarbonate slabs of Examples 7 and 8.

The YI of extruded standard PC powders obtained was compared to the YI of extruded densified PC powders. The PC powder of Example 7 was PC1 and the PC powder of Example 8 was PC1 with the tris(di-tert butyl phenyl) phosphite stabilizer and solvent violet 13. The PC powders of Examples 7 and 8 were extruded and molded to form plaques with a thickness of 3.2 mm under the same conditions. Images of the molded plaques of Examples 7 and 8 can be found in FIG. 3, where 7S plaques are plaques made from the standard extruded PC of Example 7, 7D plaques are plaques made from the densified extruded PC of Example 7, 8S plaques are plaques made from the standard extruded PC of Example 8, and 8D plaques are plaques made from the standard extruded PC of Example 8. YI for laboratory scale samples was measured in accordance with ASTM D1925-1988 on injection molded 3.2 mm plaques and are shown in Table 3. Table 3 illustrates that polycarbonate materials prepared from densified polycarbonate powders surprisingly achieved a reduced yellowness index.

Set forth are some embodiments of the present method of process for manufacturing a densified polymer powder.

Embodiment 1

A process for manufacturing a densified polymer powder, the process comprising: compressing a polymer feed that has a bulk density of less than or equal to 240 kg/m$^3$ in a roll compactor comprising at least two compaction rolls at a temperature of less than or equal to 130° C. to obtain a densified polymer material, wherein a gap between the two rolls is 0.5 to 10 mm, wherein the compaction rolls operate at a speed of 3 to 30 rpm, wherein an applied pressure of the roll compactor is 0.5 to 5 MPa, wherein the polymer feed has a water content of less than or equal to 1 wt %; and milling the densified polymer material to obtain a densified polymer powder, wherein a bulk density of the densified polymer powder is greater than or equal to 250 kg/m$^3$.

Embodiment 2

The process of Embodiment 1, wherein the polymer feed comprises a PC copolymer, specifically, a polyester-polycarbonate copolymer, a polysiloxane-polycarbonate copolymer, a polycarbonate isoindolinone copolymer, or a composition comprising at least one of the foregoing.

Embodiment 3

The process of any of the preceding embodiments, wherein the polymer feed comprises a polyester-polycarbonate copolymer, wherein the polyester comprises a repeat unit derived from resorcinol.

Embodiment 4

The process of any of the preceding embodiments, wherein the polymer comprises a polyester-polycarbonate copolymer that has a glass transition temperature of 130 to 290° C. as determined in accordance with ASTM D7426-08 (2013).

Embodiment 5

The process of any of the preceding embodiments, wherein the temperature of the compaction rolls is at least 20° C. below a Tg of the polymer feed, for example, 0 to 270° C., or 15 to 250° C., or 20 to 125° C.

Embodiment 6

The process of any of the preceding embodiments, wherein the polymer feed is not melted during the compressing process.

Embodiment 7

The process of any of the preceding embodiments, wherein the densified polymer powder has one or more of a D10 value of 100 to 600 μm, a D50 value of 500 to 3,500 μm, and a D90 value of 2,000 to 8,000 μm.

Embodiment 8

The process of any of the preceding embodiments, wherein the bulk density of the densified polymer powder is at least 20% greater than the bulk density of the polymer feed.

Embodiment 9

The process of any of the preceding embodiments, wherein the polymer feed comprises an interfacial PC.

Embodiment 10

The process of Embodiment 9, wherein the interfacial PC was polymerized from a monomer composition comprising BPA and phosgene, wherein the BPA comprised 99.80 wt % BPA based on the total weight of the BPA and the phosgene comprised less than 100 ppm free chlorine based on the total weight of the phosgene.

Embodiment 11

The process of any one of Embodiments 9-10, wherein the interfacial PC was steam precipitated from a 20 to 60 wt %

PC solution in a solvent with a boiling point of 40 to 90° C. and a miscibility with water of less than 5 wt %.

Embodiment 12

The process of Embodiment 11, wherein the solvent comprised methylene chloride, chloroform, carbon tetrachloride, dichloro ethane, trichloro ethane, dichloro ethylene, trichloro ethylene, chloro propane, dichloro propane, fluoro chloro propane, chloro propene, dichloro propene, fluoro chloro propene, toluene, chlorobenzene, or a combination comprising at least one of the foregoing.

Embodiment 13

The process of any of Embodiments 9-12, wherein the feed comprises an interfacial PC, wherein the PC optionally has one or more of a Mw of 5,000 to 40,000 Daltons, a phenolic end group concentration of less than or equal to 500 ppm, a carbamate end group content of less than or equal to 10 ppm, and a halogen content of less than or equal to 500 ppm; all based on the total weight of the PC.

Embodiment 14

The process of any of the preceding embodiments, further comprising interfacially polymerizing a dihydroxy compound and a carbonate precursor in the presence of a phase transfer catalyst and a water-immiscible solvent.

Embodiment 15

The process of any of the preceding embodiments, wherein the densified polymer powder has a tap density of 1.2 to 1.4 times the bulk density of the densified polymer powder, and wherein the bulk density is 250 to 400 kg/m$^3$ of the densified polymer powder.

Embodiment 16

The process of any of the preceding embodiments, further comprising feeding the feed via a screw feeder operating at a speed of 30 to 200 rpm.

Embodiment 17

The process of any of the preceding embodiments, wherein the compressing of the polymer feed is performed at an ambient room temperature of 15 to 30° C. without actively heating the compaction rolls.

Embodiment 18

The process of any of the preceding embodiments, wherein the bulk density densified polymer powder is greater than or equal to 285 kg/m$^3$.

Embodiment 19

The process of any of the preceding embodiments, wherein the roll compactors have a textured surface, wherein the textured surface comprises surface features with a height from a peak to a valley of 0.4 to 4 μm.

Embodiment 20

The process of any of the preceding embodiments, wherein the polymer comprises a polycarbonate, a polyester, a polysiloxane, a polyetherimide, an elastomer, a copolymer comprising one or more of the foregoing, or a blend comprising at least one of the foregoing.

Embodiment 21

The process of any of the preceding embodiments, further comprising screening the densified polymer powder.

Embodiment 22

The process of any of the preceding embodiments, further comprising transporting the densified polymer powder to a second location.

Embodiment 23

The process of Embodiment 22, wherein the second location is a customer or a finishing plant.

Embodiment 24

The process of any of the preceding embodiments, wherein an applied pressure in the roll compactor is 1 to 5 MPa, or 3.5 to 5 MPa.

Embodiment 25

The process of any of the preceding embodiments, wherein the milling comprises cutter milling, hammer milling, pin milling, jet milling, grinding milling, freeze milling, or a combination comprising at least one of the foregoing.

Embodiment 26

The process of any of the preceding embodiments, wherein the milling is carried out at a temperature of −200 to +100° C., or 10 to 30° C.

Embodiment 27

The process of any of the preceding embodiments, wherein the milling is freeze milling.

Embodiment 28

A densified polymer powder made by the process of any of the preceding embodiments.

Embodiment 29

The densified polymer powder of Embodiment 28, wherein the densified polymer powder comprises less than or equal to 10 ppm of a halogened solvent content, based on the total weight of the densified polymer powder.

Embodiment 30

The densified polymer powder of any of Embodiments 28-29, wherein the densified polymer powder comprises less than or equal to 10 ppm of iron and less than or equal to 100 ppm of a combined bromine and chlorine content, based on the total weight of the densified polymer powder.

Embodiment 31

The densified polymer powder of any of Embodiments 28-30, wherein the densified polymer powder comprises densified polycarbonate with a hydroxyl end group content of less than or equal to 20 ppm and a carbamate end group content of less than 10 ppm based on the total weight of the densified polymer powder.

Embodiment 32

A process of processing a densified polymer powder comprising, melt processing a melt feed comprising the densified polymer powder of any one of Embodiments 28-31 at a temperature of 250 to 370° C. to form a densified melt processed polymer, wherein a molded material with a thickness of 3.2 mm made of the densified melt processed powder has a lower Yellowness Index as compared to a molded material of a melt processed polymer of the sample polymer powder that was not densified.

Embodiment 33

The process of Embodiment 32, wherein the melt processing comprises extruding the melt feed.

Embodiment 34

The process of Embodiment 33, wherein the extruding is at a vacuum of 10 to 25 in-Hg and a screw spin speed of 300 to 600 rpm.

Embodiment 34

The process of any of Embodiments 32-33, wherein the densified polymer powder is the polymer powder of any of Embodiments 28-31.

Embodiment 35

The process of any of Embodiments 32-34, wherein the melt feed comprises an additive.

Embodiment 36

The process of Embodiment 35, wherein the additive comprises a colorant, a UV stabilizer, or a combination comprising at least one of the foregoing.

Embodiment 37

The process of Embodiment 36, wherein the stabilizer comprises a phosphorus containing stabilizer in an amount of 0.001 to 1 wt % based on the total weight of the feed.

Embodiment 38

The process of any of Embodiments 36-37, wherein the stabilizer comprises a benzotriazole stabilizer in an amount of 0.1 to 5 wt % based on the total weight of the feed.

Embodiment 39

The process of any of Embodiments 36-38, wherein the colorant comprises a quinone based colorant in an amount of 0.0001 to 5 wt % based on the total weight of the feed.

Embodiment 40

The process of any of Embodiments 36-39, wherein the colorant comprises a Solvent Green 3 (R32P), Solvent Green 28 (R36), Solvent Red 52 (R63), Solvent Red 111 (R61), Solvent Red 207 (R666), Solvent Violet 13 (R71), Solvent Violet 36 (R72), Disperse Blue 72, Pigment Blue 60 (R7260), Vat Blue 4, Solvent Blue 97 (R73), Solvent Blue 101 (R773), Solvent Blue 104 (R75), Anthraquinone Blue (R774) Solvent Yellow 163 (R84), Pigment Red 117, Disperse Blue 14, or a combination comprising one or more of the foregoing.

Embodiment 41

An extruded densified polymer extruded by the process of any of Embodiments 31-40.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. "Or" means "and/or." Unless otherwise clearly specified herein, the test standards are the most recent standard available as of the filing date of this application.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. In addition, it is to be understood that the described elements may be combined in any suitable manner in the various embodiments.

With respect to the figures, it is noted that these figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the description for the sake of clarity, these terms are intended to refer only to the particular structure of the embodiments selected for illustration in the drawings, and are not intended to define or limit the scope of the disclosure. In the drawings and the description herein, it is to be understood that like numeric designations refer to components of like function.

Disclosure of a narrower range in addition to a broader range is not a disclaimer of the broader range. Unless defined otherwise, technical and scientific terms used herein have the same meaning as is commonly understood by one of skill in the art to which this invention belongs. "Optional" or "optionally" means that the subsequently described event or circumstance can or cannot occur, and that the description includes instances where the event occurs and instances where it does not.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

This application claims the benefit of U.S. Provisional Patent Application Ser. No. 62/076,850 filed Nov. 7, 2014 and Ser. No. 62/218,163 filed Sep. 14, 2015. The related applications are incorporated herein by reference.

We claim:

1. A process for manufacturing a densified polycarbonate powder, comprising:
compressing a polymer feed comprising an interfacial polycarbonate that has a bulk density of less than or equal to 240 kg/m$^3$ in a roll compactor comprising at least two compaction rolls at a temperature of less than or equal to 130° C. to obtain a densified polymer material, wherein a gap between the two rolls is 0.5 to 10 mm, wherein the compaction rolls operate at a speed of 3 to 30 rpm, wherein an applied pressure of the roll compactor is 0.5 to 5 MPa, wherein the polymer feed has a water content of less than or equal to 1 wt %; and
milling the densified polymer material to obtain the densified polycarbonate powder,
wherein a bulk density of the densified polycarbonate powder is greater than or equal to 250 kg/m$^3$.

2. The process of claim 1, wherein the polymer feed comprises a polyester-polycarbonate copolymer, a polysiloxane-polycarbonate copolymer, a polycarbonate polyisoindolinone copolymer, or a composition comprising at least one of the foregoing.

3. The process of claim 1, wherein the polymer feed comprises a polyester-polycarbonate copolymer, wherein the polyester comprises a resorcinol derived repeat unit.

4. The process of claim 1, wherein the polymer comprises a polyester-polycarbonate copolymer that has a Tg of 130 to 290° C.

5. The process of claim 1, wherein the temperature is at least 20° C. below a glass transition temperature of the polymer feed.

6. The process of claim 1, wherein the polymer feed is not melted during the compressing process.

7. The process of claim 1, wherein the densified polymer powder has one or more of a D10 value of 100 to 600 micrometers, a D50 value of 500 to 3,500 micrometers, and a D90 value of 2,000 to 8,000 micrometers.

8. The process of claim 1, wherein the bulk density of the densified polymer powder is at least 20% greater than the bulk density of the polymer feed.

9. The process of claim 1, wherein the interfacial polycarbonate was polymerized from a monomer composition comprising BPA and phosgene, wherein the BPA comprised 99.80 wt % BPA based on the total weight of the BPA and the phosgene comprised less than 100 ppm free chlorine based on the total weight of the phosgene.

10. The process of claim 1, wherein the interfacial polycarbonate was steam precipitated from a 20 to 60 wt % polycarbonate solution in a solvent with a boiling point of 40 to 90° C. and a miscibility with water of less than 5 wt %.

11. The process of claim 10, wherein the solvent comprised methylene chloride, chloroform, carbon tetrachloride, dichloro ethane, trichloro ethane, dichloro ethylene, trichloro ethylene, chloro propane, dichloro propane, fluoro chloro propane, chloro propene, dichloro propene, fluoro chloro propene, toluene, chlorobenzene, or a combination comprising at least one of the foregoing.

12. The process of claim 1, wherein the densified polymer powder has a tap density of 1.2 to 1.4 times the bulk density of the densified polymer powder, and wherein the bulk density is 250 to 400 kg/m$^3$ of the densified polymer powder.

13. A process of processing a densified polycarbonate powder comprising,
compressing a polymer feed comprising an interfacial polycarbonate that has a bulk density of less than or equal to 240 kg/m$^3$ in a roll compactor comprising at least two compaction rolls at a temperature of less than or equal to 130° C. to obtain a densified polymer material, wherein a gap between the two rolls is 0.5 to 10 mm, wherein the compaction rolls operate at a speed of 3 to 30 rpm, wherein an applied pressure of the roll compactor is 0.5 to 5 MPa, wherein the polymer feed has a water content of less than or equal to 1 wt %;
milling the densified polymer material to obtain the densified polycarbonate powder,
wherein a bulk density of the densified polycarbonate powder is greater than or equal to 250 kg/m$^3$; and
melt processing a melt feed comprising the densified polycarbonate powder of at a temperature of 250 to 370° C. to form a densified melt processed polycarbonate,
wherein a molded material with a thickness of 3.2 mm made of the densified melt processed polycarbonate has a lower Yellowness Index as compared to a molded material of a melt processed polymer of the sample polycarbonate powder that was not densified.

14. The process of claim 13, wherein the melt processing comprises extruding.

15. The process of claim 14, wherein the melt feed comprises a colorant, a UV stabilizer, or a combination comprising one or more of the foregoing.

16. A process for manufacturing a densified polycarbonate powder, comprising:
  interfacially polymerizing a polycarbonate; wherein the polycarbonate comprises a bisphenol based polycarbonate, a polyester-polycarbonate copolymer, a resorcinol based polyester polycarbonate copolymer, a polysiloxane-polycarbonate copolymer, or a polycarbonate polyisoindolinone copolymer;
  steam precipitating the polycarbonate from a 20 to 60 wt % solution of polycarbonate in a solvent with a boiling point of 40 to 90° C. and a miscibility with water of less than 5 wt %;
  compressing a polymer feed comprising the polycarbonate that has a bulk density of less than or equal to 240 kg/m$^3$ in a roll compactor comprising at least two compaction rolls at a temperature of less than at least 20° C. below the glass transition temperature of the polycarbonate to obtain a densified polymer material, wherein a gap between the two rolls is 0.5 to 10 mm, wherein the compaction rolls operate at a speed of 3 to 30 rpm, wherein an applied pressure of the roll compactor is 0.5 to 5 MPa, wherein the polymer feed has a water content of less than or equal to 1 wt %;
  milling the densified polymer material to obtain the densified polycarbonate powder, wherein a bulk density of the densified polycarbonate powder is at least 20% greater than the bulk density of the powder feed and comprises less than or equal to 10 ppm iron and less than or equal to 100 ppm of bromine and chlorine, and
  melt processing the densified polycarbonate powder and at least one colorant and a UV stabilizer into a polycarbonate article having a hydroxyl end group content of less than or equal to 20 ppm and a carbamate end group content of less than 10 ppm.

* * * * *